United States Patent
Burczyk et al.

(10) Patent No.: US 6,581,469 B2
(45) Date of Patent: Jun. 24, 2003

(54) DIFFERENTIAL PRESSURE SENSOR AND METHOD OF DIFFERENTIAL PRESSURE MEASUREMENT

(75) Inventors: Dietfried Burczyk, Teltow (DE); Wolfgang Dannhauer, Teltow (DE); Ralf Nürnberger, Potsdam (DE)

(73) Assignee: Endress + Hauser GmbH Co., Maulburg (DE)

( * ) Notice: Subject to any disclaimer, the term of this patent is extended or adjusted under 35 U.S.C. 154(b) by 0 days.

(21) Appl. No.: 10/042,297

(22) Filed: Jan. 11, 2002

(65) Prior Publication Data

US 2002/0108447 A1 Aug. 15, 2002

Related U.S. Application Data

(60) Provisional application No. 60/279,686, filed on Mar. 30, 2001.

(30) Foreign Application Priority Data

Jan. 12, 2001 (DE) .......................................... 101 01 180

(51) Int. Cl.$^7$ ............................................... G01L 15/00
(52) U.S. Cl. ............................................................ 73/716
(58) Field of Search .............................. 73/716, 718, 721, 73/724, 514, 729, 706; 338/4, 42; 361/283

(56) References Cited

U.S. PATENT DOCUMENTS

| | | | |
|---|---|---|---|
| 4,221,134 A | * | 9/1980 | Ekstrom, Jr. ................. 73/721 |
| 4,257,274 A | | 3/1981 | Shimada et al. |
| 5,684,253 A | | 11/1997 | Bonne et al. |

* cited by examiner

*Primary Examiner*—Hezron Williams
*Assistant Examiner*—Marissa Ferguson
(74) *Attorney, Agent, or Firm*—Jones, Tullar & Cooper, P.C.

(57) ABSTRACT

A differential pressure sensor, for determining the differential pressure between two measuring points, comprises a pressure vessel which is filled with a transfer fluid; a measuring cell which is arranged in the pressure vessel and is surrounded by the transfer fluid, with two half-cells; a diaphragm-like deforming body which separates the two half-cells from each other in a pressuretight manner; two pressure supply lines, which respectively feed the pressure from one of the two measuring points outside the pressure vessel to one of the two half-cells; and at least one pressure accumulator, the pressure of which acts on the transfer fluid in the vessel. Elastic or compressible bodies with a linear or degressive characteristic are suitable as the pressure accumulator. The pressure accumulator compensates for changes in volume of the transfer fluid on account of temperature fluctuations.

17 Claims, 4 Drawing Sheets

DIFFERENTIAL PRESSURE SENSOR AND METHOD OF DIFFERENTIAL PRESSURE MEASUREMENT

REFERENCE TO PRIOR APPLICATION

This application relies for priority on a prior filed provisional application, filed Mar. 30, 2001 and assigned Ser. No. 60/279,686.

FIELD OF THE INVENTION

The invention relates to a differential pressure sensor and to a method of fitting it. More precisely, the invention concerns a differential pressure sensor with an isostatically mounted pressure measuring cell.

BACKGROUND OF THE INVENTION

Differential pressure cells are used in particular for measuring small pressure differences between great static pressures. Therefore, the cells have to be dimensioned to withstand the static pressures. In the case of a measuring cell comprising two half-cells which are separated from each other by means of a central diaphragm, particularly the joints between the separating diaphragm and the half-cells must therefore also be of a correspondingly strong design, in order for example to withstand the strong peel stresses which occur on account of the great difference in pressure between the inside of the cell and the surroundings. However this inevitably leads to a stiffening of the measuring diaphragm or similar impairments, which ultimately impair the measuring accuracy of the differential pressure sensor.

For the purpose of improved measuring accuracy, it is desirable to relieve the joints and consequently reduce the dimensioning requirements. In this respect, Bonne discloses in U.S. Pat. No. 5,684,253 a differential pressure sensor in which the pressure measuring cell is arranged in a chamber of a housing, with the pressure supply line to one half-cell of the pressure measuring cell having a branch, so that the medium from the pressure supply line also surrounds the measuring cell and subjects it to the measuring pressure in question. In this way, the pressure difference between the interior of the half-cell and the surroundings of the pressure measuring cell is largely eliminated. If the pressure in the second half-cell is at a similar level to that in the first half-cell, the arrangement described offers adequate protection for constant pressure conditions. However, this arrangement proves to be susceptible to pressure fluctuations or surges, since the pressure in one half-cell may significantly exceed the ambient pressure, which is identical to the pressure in the other half-cell. It is therefore necessary after all to design the joints between the half-cells and the diaphragm to be very resistant and consequently to accept the compromises described at the beginning with regard to the measuring accuracy.

SUMMARY OF THE INVENTION

It is therefore the object of the present invention to provide a differential pressure sensor which, while of sufficient sensitivity, can also withstand pressure fluctuations.

The object is achieved according to the invention by the differential pressure sensor having: a pressure vessel which is filled with a transfer fluid; a measuring cell which is arranged in the pressure vessel and is surrounded by the transfer fluid, with two half-cells and a diaphragm which separates the two half-cells from each other in a pressure-tight manner; two pressure lines which respectively feed the pressure from one of the two measuring points outside the pressure vessel to one of the two half-cells, the pressure supply lines having no fluid communication with the vessel; and at least one pressure accumulator, the pressure of which acts on the transfer fluid in the vessel, and the method comprising the steps of: preparing a differential pressure measuring cell with two half-cells and a separating diaphragm in a pressure vessel; filling the pressure vessel with a transfer fluid; subjecting the transfer fluid to a pressure which is at least as great as the nominal pressure at the measuring points; connecting the two measuring points to a half-cell in each case, of the differential pressure sensor; and compensating for changes in volume of the transfer fluid by means of an elastic pressure accumulator which communicates with the transfer fluid in the pressure vessel.

The transfer fluid in the pressure vessel is preferably subjected to a pressure which is greater than the nominal static pressure of the differential pressure sensor and, as a particular preference, is greater than the maximum values occurring when there are pressure surges.

In a preferred embodiment, the pressure accumulator has at least one elastically deformable body which is suitable for compensating for changes in volume of the transfer fluid caused by temperature fluctuations and for keeping the pressure in the pressure vessel within a predetermined range. Furthermore, the pressure accumulator may comprise a pneumatic component which is compressed when there is increasing volume of the transfer fluid and expands in the converse case. A combination of an elastic body with a pneumatic element is likewise suitable for realizing a pressure accumulator.

In the case of a linearly elastic body, for example a helical spring or some other axially compressible spring in a flexible bellows, the force is proportional to the relative change in length of the elastic body. Consequently, in the case of a pressure accumulator with a linearly elastic body, the increase in pressure is proportional to the relative change in volume of the latter. Therefore, a minimum volume for the pressure accumulator follows from the change in volume of the transfer fluid to be expected over the range of operating temperatures and the permissible tolerance range for the pressure in the pressure vessel.

As an alternative to linearly elastic bodies, the pressure accumulator may also comprise non-linearly elastic bodies with a degressive characteristic. This can be achieved on the one hand by elastic materials with a degressive characteristic or on the other hand by a non-linear articulation of linearly elastic bodies. The non-linearly elastic materials include, for example, shape-memory alloys, for example a work-hardened Ni—Ti alloys which, when deflected, form a stress-induced martensite from an austenitic phase. The transition into the martensitic phase produces a degressive characteristic. A non-linear deflection with resultant degressive characteristic can be realized for example by means of a compression spring arrangement with two or more compression springs, the longitudinal axes of which preferably lie symmetrically on the lateral area of a cone with a variable apex angle, the axis of symmetry of which defines the direction of compression of the pressure accumulator. Similar spring arrangements with variable angle of inclination or scroll springs are likewise suitable for achieving a degressive characteristic.

The pressure accumulator may likewise be realized by compressible or elastic packing bodies which are introduced into the pressure vessel. This on the one hand leads to a minimization of the residual volume in the pressure vessel to be filled with the transfer fluid and on the other hand makes it possible for a pressure vessel to be adapted comparatively easily to different sensor elements by filling the intermediate space with packing bodies and transfer fluid in a suitable volume ratio, the transfer fluid being subjected to the required pressure. Examples of suitable packing bodies are solid beads or hollow beads of elastic materials. The use of porous elastic materials likewise allows the porosity of the volume fraction of the transfer fluid in the pressure vessel to be controlled.

Instead of a large number of packing bodies, the interior of the pressure vessel may also be filled with a suitable foam, the proportion of closed pores, open pores and solid material being the parameters by which the volume remaining for the transfer fluid can be controlled.

The method according to the present invention for measuring a pressure difference between two measuring points comprises the steps of preparing a differential pressure measuring cell with two half-cells and a separating diaphragm, in a pressure vessel; filling the pressure vessel with a transfer fluid; subjecting the transfer fluid to a pressure which is at least as great as the nominal pressure at the measuring points; connecting the two measuring points to a half-cell in each case; of the differential pressure sensor; and compensating for changes in volume of the transfer fluid by means of an elastic pressure accumulator which communicates with the transfer fluid in the pressure vessel.

BRIEF DESCRIPTIONS OF THE DRAWINGS

The invention is explained in more detail with reference to the following drawings, in which.

DESCRIPTION OF THE PREFERRED EMBODIMENTS

Figure 1:
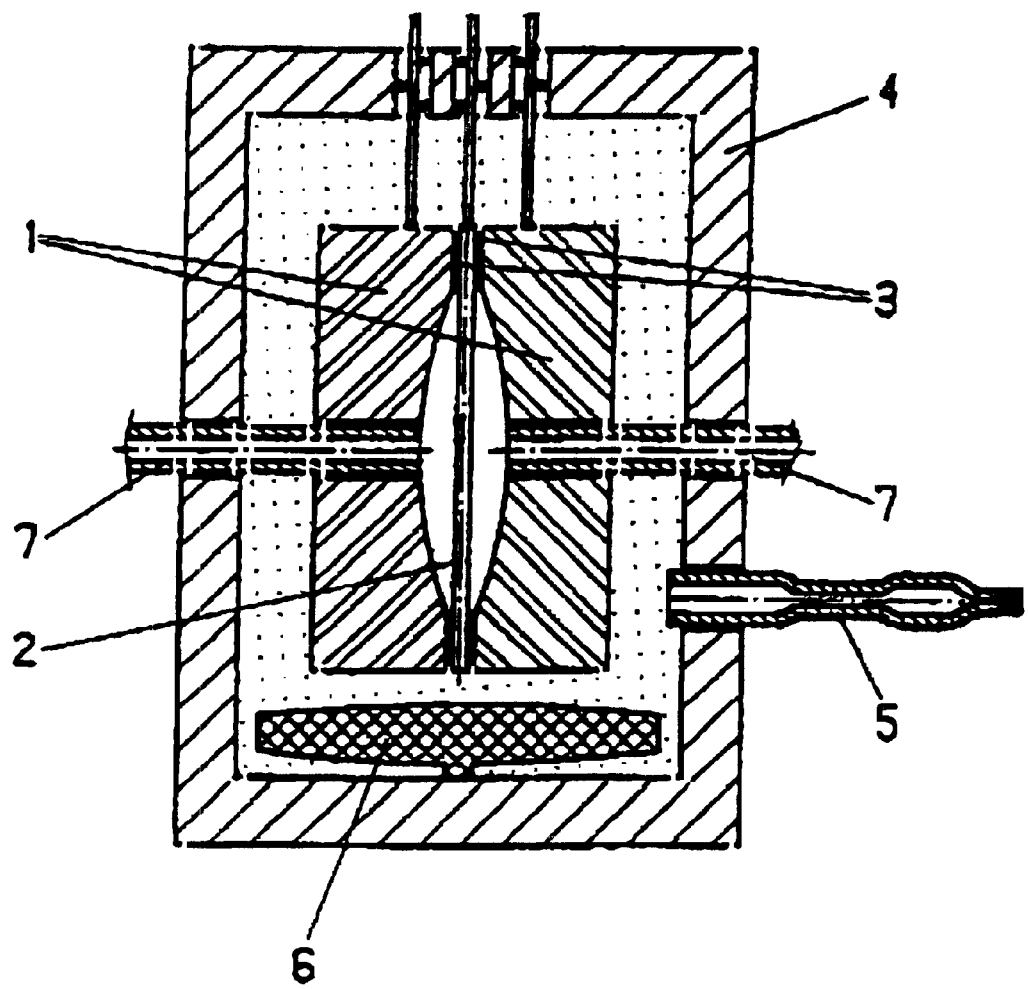
FIG. 1 shows a longitudinal section through a differential pressure sensor according to the invention.

The longitudinal section in FIG. 1 shows the essential components of a differential pressure sensor according to the invention. The actual measuring cell comprises two half-cells 1, which are separated from each other in a pressure-tight manner by a measuring diaphragm 2. The half-cells 1 are respectively connected to a measuring point and subjected to the pressure prevailing there via two pressure supply lines 7, whereby the diaphragm 2 is deformed in a way corresponding to the difference in pressure. The deformation is converted into a measuring signal either capacitively, resistively or inductively. The measuring cell is enclosed in a pressure vessel which is filled with a transfer fluid, for example a hydraulic oil or the like. The transfer fluid should be as incompressible as possible and be present as a liquid phase over the entire range of operating temperatures. The pressure vessel is preferably dimensioned in such a way that it does not undergo any deformations due to changes in volume or pressure of the transfer fluid during operation. Metallic materials, in particular steel, are suitable as the material for the pressure vessel.

A filling nozzle 5 is provided in the embodiment shown for filling the pressure vessel 4 with a transfer fluid, which after filling can be squeezed together in order to increase further the pressure in the pressure vessel 4. A ram or plunger, which, for setting the pressure in the vessel, is inserted variable, for example by screwing in, may optionally also be provided. Both a filling nozzle and a ream or plunger can in principle be provided in every embodiment, even if it is no longer expressly mentioned below.

Also arranged in the pressure vessel is a pressure accumulator 6, which has an elastically deformable body which compensates for changes in volume of the transfer fluid. Such changes in volume occur in particular on account of temperature fluctuations in the pressure vessel 4. Without a pressure accumulator, it would not be possible to keep the pressure in the pressure vessel 4 in a tolerance range, since the transfer fluid is not sufficiently compressible.

Figure 2A:
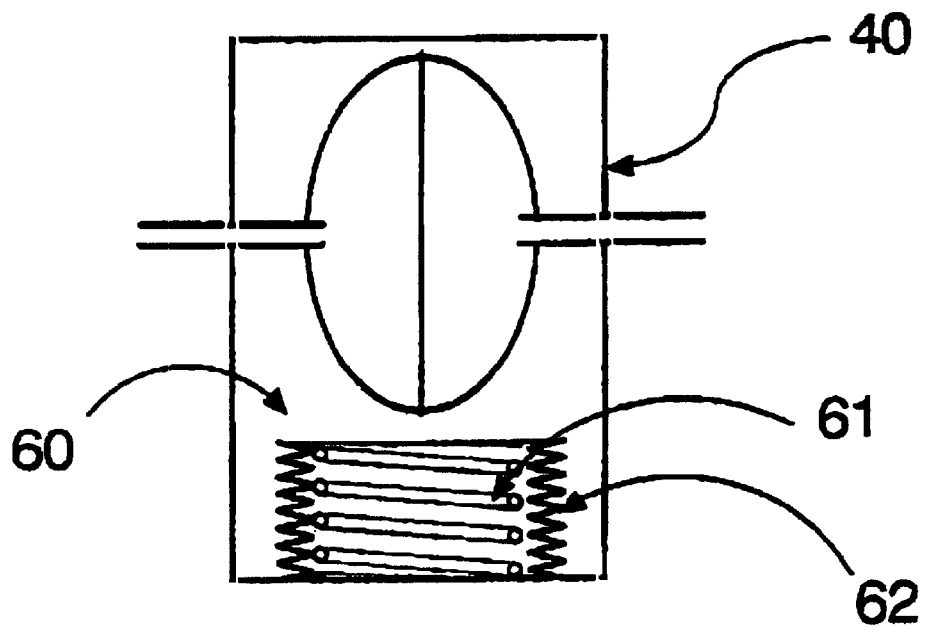
FIG. 2a shows a schematic longitudinal section through a differential pressure sensor according to the invention with a linearly elastic pressure accumulator.

The operating principle of a pressure accumulator is now explained on the basis of the diagram in FIG. 2a. Here, the pressure accumulator 60 comprises a compression spring 61, here a compression coil spring, which controls the axial deflection of a bellows 62. The spring 61 is preferably biased by suitable means (not shown here), so that when subjected to the required pressure at the minimal operating temperature of the sensor, i.e. the minimal volume of the transfer fluid, only a small additional compression takes place. If the temperature of the transfer fluid increases, said fluid expands, and the accompanying increase in pressure then leads to a further compression of the compression spring 61 and of the bellows 62.

Instead of the compression coil spring 61, metallic cup springs and temperature-resistant elastomers, for example EPDM, NBR and HMBR, also come into consideration as the core of the pressure accumulator.

Dimensioning considerations for a pressure accumulator are now explained on the basis of a system with a silicone oil as the transfer fluid. Silicone oils have, for example, a coefficient of volume expansion of $\gamma=90 \ldots 160*10^{-5}/K$. The following estimates are based on $\gamma=0.1\%/K$. When there is a fluctuation in the operating temperature over a range of 80 K, for example of $-10°$ C. and $70°$ C., the volume changes by $\Delta V_{oil}=8\%$. The elastic body should therefore be dimensioned in such a way that it can compensate for this change in volume. Preferably, the pressure in the pressure vessel should change only within a certain range over the entire temperature range $\Delta T$, in order not to vary the external pressure exposure of the measuring cell too much.

In the case of a linearly elastic behavior of the elastic body according to Hooke's law, the relative change in pressure is proportional to the relative change in volume:

$$\Delta P/P \alpha \Delta V_{body}/V_{body}.$$

Since, however, the change in volume of the body corresponds to the temperature-induced change in volume of the transfer fluid, that is here the oil ($\Delta V_{oil}=V_{oil}*\gamma*\Delta T$), the following applies:

$$\Delta P/P = \gamma*\Delta T*V_{oil}/V_{body}.$$

With a given oil volume, the pressure fluctuations are consequently inversely proportional to the volume of the elastic body and, with a given body volume, proportional to the volume of the oil.

It consequently follows for the construction of the differential pressure sensor that the volume of the transfer fluid or the oil volume must be minimized, and the volume of the elastic body must be maximized in relation to the oil volume if the pressure fluctuations in the pressure vessel are to be minimized with a linearly elastic body.

To minimize the volume of the transfer fluid, on the one hand the dimensions of the pressure measuring cell and of the pressure vessel can be made to match one another in such a way that only a minimal residual volume remains, just sufficient to subject the measuring cell completely to the pressure of the transfer fluid from the outside.

A suitable alternative is to introduce into the pressure vessel packing bodies which minimize the volume remaining for the transfer fluid. If the packing bodies comprises a sufficiently compressible or elastic material, they can at the same time perform the function of a pressure accumulator, or an additional pressure accumulator can be made correspondingly smaller.

Figure 3:
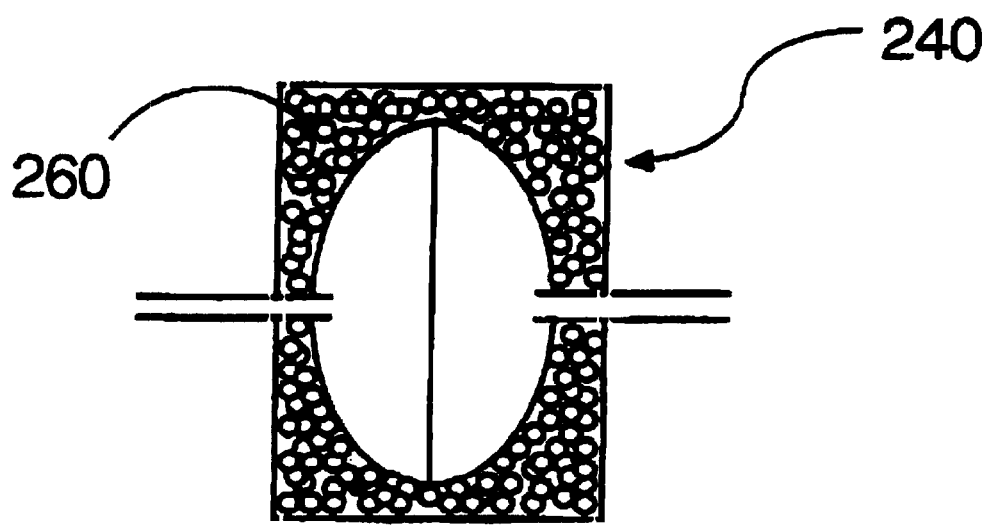
FIG. 3 shows a schematic longitudinal section through a differential pressure sensor according to the invention with an elastic pressure accumulator formed by packaging bodies.

An example of this is given in FIG. 3, with the entire space between the walls of the pressure vessel 240 and the pressure measuring cell here initially being filled with compressible packing bodies 260, for example beads, cylinders, cubes, tetrahedrons or the like, before the remaining residual volume between the filling bodies is filled with the transfer fluid, and the latter is subjected to the required pressure. Thermoelastic polymers that are stable at high temperatures, such as NBR, HNBR or EPDM, come into consideration in particular as the material for the elastic packing bodies. It goes without saying that different materials may also be combined, or the packing bodies may be made to be of a solid form or with cavities in order to set the desired elasticity or compressibility. For some applications it is advantageous to interlink the packing bodies, in order for example to avoid a local accumulation of the packing bodies in one region of the pressure vessel.

Figure 2B:
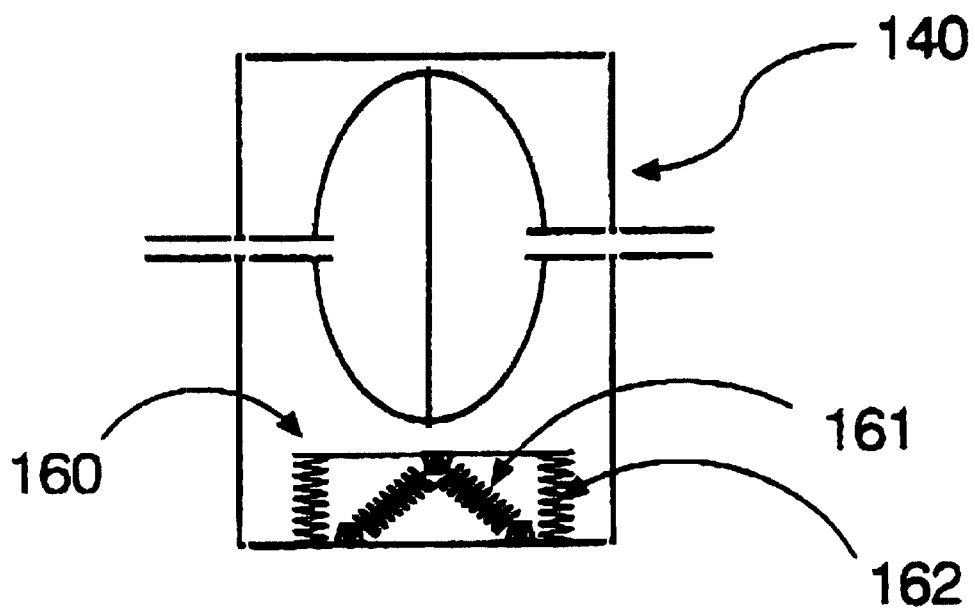
FIG. 2b shows a schematic longitudinal section through a differential pressure sensor according to the invention with a non-linearly elastic pressure accumulator.
Figure 4:
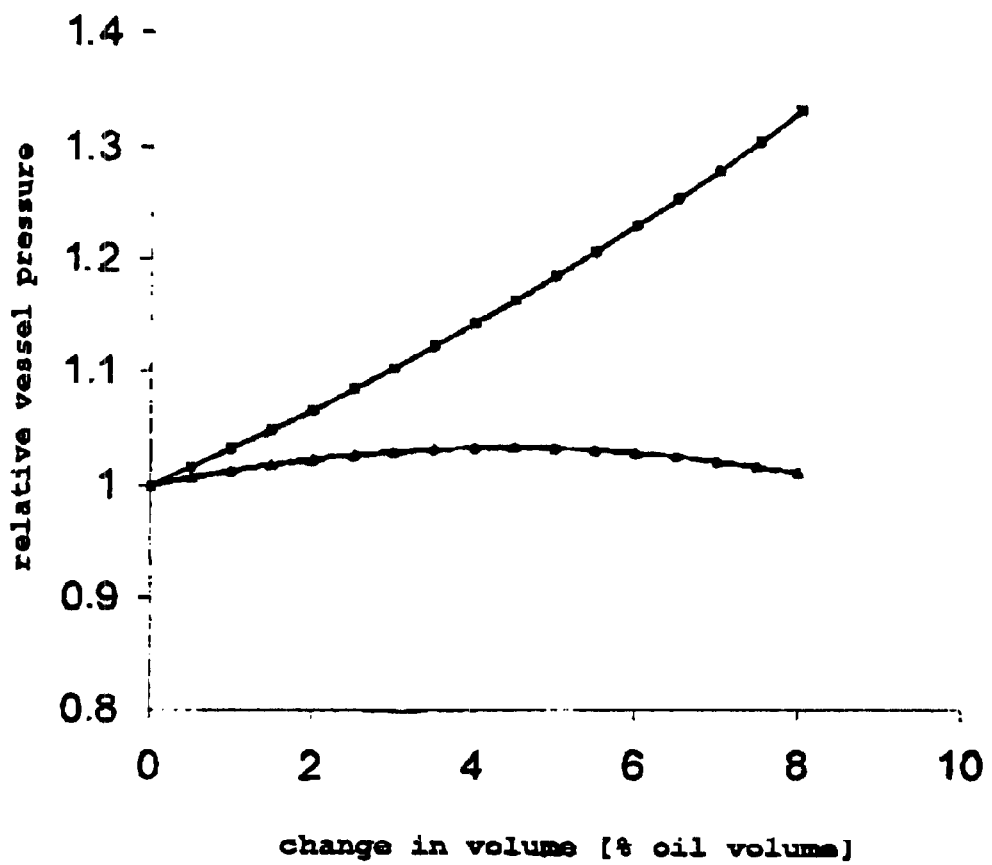
FIG. 4 shows a diagram of the pressure development in the pressure vessel when using linearly elastic and non-linearly elastic accumulators.

An example of an encapsulated differential pressure sensor according to the invention, wherein the pressure accumulator 160 has a degressive characteristic, is now presented with reference to FIGS. 2 and 4. As in the case of the example from FIG. 2a, the pressure accumulator of the example from FIG. 2b comprises a spring arrangement 161 in a bellows 162. In this case, however, the compression springs 161 are not arranged parallel to the direction of compression of the bellows. Instead, a plurality of compression springs 161 are anchored by their respective first end symmetrically on a base area and by their respective second end centrally on the end face of the bellows 162. The direction of compression of the individual compression springs 161 is consequently inclined with respect to the direction of compression of the bellows, the angle of inclination increasing with the compression of the bellows. This has two consequences. Firstly, the incremental compression of the springs decreases with increasing compression of the bellows, and secondly the proportion of the spring force, which acts as a counter-force to the compression of the bellows, becomes less and less, since this is only the projection of the entire spring force onto the direction of compression of the bellows. By suitable choice of the angle of inclination and the biasing of the springs 161, the system can be designed in such a way that the changes in the restoring force, and consequently in the pressure in the pressure vessel, with increasing compression of the pressure accumulator are considerably reduced.

To explain the effect, FIG. 4 shows the pressure development (identified by triangles), following from the degressive characteristic, of an arrangement based on the principle of FIG. 2b in comparison with the pressure development (identified by squares) when using an arrangement according to FIG. 2a. In both cases, the oil used as the transfer fluid has at a low initial temperature a minimal volume which corresponds to 3.125 times the volume of the pressure accumulator in this state. When there is an expansion of the oil with increasing temperature by 8% of the oil volume, the pressure accumulator is therefore compressed by 25% of its volume. In the case of the embodiment according to FIG. 2a, the spring arranged parallel to the direction of compression of the pressure accumulator is consequently compressed by 25% of its initial length. This leads to a pressure increase to 4/3 of the initial value.

The springs of the exemplary embodiment according to FIG. 2b have at the beginning, with a minimal oil volume, an angle of inclination of approximately 62° with respect to the compression axis of the pressure accumulator. As compression progresses, the angle of inclination increases to approximately 68°. In the initial state, the springs are already compressed by 15% to a length of 85% of their equilibrium length, the springs being compressed by 25% compression of the pressure accumulator to approximately 80% of the equilibrium length. As a result, the inclined arrangement of the springs 161 achieves a degressive characteristic which restricts the pressure increase on account of the compression of the pressure accumulator to approximately 3.3%, while the pressure increase in the case of the linear arrangement is 33%. This is an improvement by a factor of ten. If the springs 161 are inclined to a lesser extent, the improvement is significantly less. With an initial angle of inclination of approximately 57°, which increases due to the compression of the pressure accumulator to approximately 64°, a pressure increase by approximately 10% results under otherwise the same conditions as in the case of the first example, on account of the 25% compression of the pressure accumulator.

In principle, apart from the angles of inclination, the number and type of springs, their biasing and material properties and the like can be adapted to the respective requirements.

Furthermore, the aspects of the present invention described above can be combined with one another and varied in any way desired without departing from the basic idea of the present invention.

What is claimed is:

1. A differential pressure sensor, for determining the differential pressure between two measuring points, comprising:

a pressure vessel which is filled with a transfer fluid;

a measuring cell which is arranged in said pressure vessel and is surrounded by the transfer fluid, with two half-cells;

a diaphragm which separates said two half-cells from each other in a pressuretight manner;

two pressure supply lines, which respectively feed the pressure from one of the two measuring points outside said pressure vessel to one of said two half-cells, said pressure supply lines having no fluid communication with said vessel; and at least one pressure accumulator, the pressure of which acts on the transfer fluid in said vessel.

2. The differential pressure sensor as claimed in claim 1, wherein said at least one pressure accumulator is arranged in said pressure vessel.

3. The differential pressure sensor as claimed in claim 2, wherein said at least one pressure accumulator has at least one compressible body.

4. The differential pressure sensor as claimed in claim 3, wherein said at least one compressible body has an elastic element made of metal or a thermoelastic plastic.

5. The differential pressure sensor as claimed in claim 4, wherein said elastic element is a compression spring.

6. The differential pressure sensor as claimed in claim 4, wherein said elastic element is surrounded by a flexible material.

7. The differential pressure sensor as claimed in claim 1, wherein said pressure accumulator has a pneumatic element.

8. The differential pressure sensor as claimed in claim 7, wherein the pressure in said pneumatic element is externally controllable.

9. The differential pressure sensor as claimed in claim 1, further comprising:

a filling nozzle for filling said pressure vessel with transfer fluid.

10. The differential pressure sensor as claimed in claim 9, wherein said filling nozzle has a metallic tube which can be pinched off in order to increase the pressure in said pressure vessel after the filling of said pressure vessel.

11. The differential pressure sensor as claimed in claim 1, further comprising:

a displacement body which can be introduced into said pressure vessel in order to control the pressure in said pressure vessel.

12. The differential pressure sensor as claimed in claim 11, wherein the pressure in said pressure vessel is at least 1.2 times, preferably 1.5 times, particularly preferably 2 times, the nominal pressure.

13. The differential pressure sensor as claimed in claim 1, wherein the pressure in said pressure vessel is greater than the nominal pressure for the two measuring points for all operating temperatures in the permissible temperature range.

14. The differential pressure sensor as claimed in claim 1, wherein the transfer fluid is an oil.

15. The differential pressure sensor as claimed in claim 1, wherein second pressure accumulator has a degressive characteristic.

16. The differential pressure sensor as claimed in claim 1, wherein said pressure accumulator is formed by elastic packing bodies which are arranged in said pressure vessel.

17. A method of measuring a pressure difference between two measuring points, comprising the steps of:

preparing a differential pressure measuring cell with two half-cells and a separating diaphragm, in a pressure vessel;

filling the pressure vessel with a transfer fluid;

subjecting the transfer fluid to a pressure which is at least as great as the nominal pressure at the two measuring points;

connecting the two measuring points to a half-cell of the differential pressure sensor; and compensating for changes in volume of the transfer fluid by means of an elastic pressure accumulator which communicates with the transfer fluid in the pressure vessel.

* * * * *